United States Patent [19]

Nakamura

[11] Patent Number: 5,000,540

[45] Date of Patent: Mar. 19, 1991

[54] SENSING SYSTEM USING OPTICAL FIBERS

[75] Inventor: Kazunori Nakamura, Kanagawa, Japan

[73] Assignee: The Furukawa Electric Co., Ltd., Tokyo, Japan

[21] Appl. No.: 443,943

[22] Filed: Dec. 1, 1989

[30] Foreign Application Priority Data

Dec. 1, 1988 [JP] Japan ................. 63-305037

[51] Int. Cl.$^5$ ............................ G02B 6/02; H01J 5/16
[52] U.S. Cl. ................. 350/96.29; 350/96.30; 350/96.34; 250/227.14; 250/227.19
[58] Field of Search ............. 350/96.10, 96.15, 96.16, 350/96.20, 96.29, 96.30, 96.34; 250/227.11, 227.14, 227.15, 227.16, 227.18, 227.19; 372/6

[56] References Cited

U.S. PATENT DOCUMENTS

| | | | |
|---|---|---|---|
| 4,778,238 | 10/1988 | Hicks | 350/96.16 |
| 4,790,619 | 12/1988 | Lines et al. | 350/96.34 |
| 4,834,497 | 5/1989 | Angel | 350/96.29 |
| 4,893,894 | 1/1990 | Caimi | 350/96.29 |
| 4,910,737 | 3/1990 | Payne et al. | 372/6 |

Primary Examiner—Brian Healy
Attorney, Agent, or Firm—Foley & Lardner, Schwartz, Jeffery, Schwaab, Mack, Blumenthal & Evans

[57] ABSTRACT

A sensing system using optical fibers having loss characteristics subject to variations of a signal light wave as a pumping light wave with a wavelength different from that of a pumping light wave is coupled into said optical fiber. Unlike conventional OTDRs that utilizes a light back scattering in an optical fiber, a sensing system using optical fibers according to the invention utilizes the light passing through an optical fiber as a detected signal in order to enhance the efficiency and effectiveness of the system and, therefore, it has a significantly improved S/N ratio and a dynamic range of measurement as compared with conventional OTDRs. Moreover, continuous light may be used for the signal light wave (detected signal) to increase the rate of light emission for detection and to reduce the time required for measurement.

7 Claims, 4 Drawing Sheets

TO SIGNAL PROCESSING SYSTEM

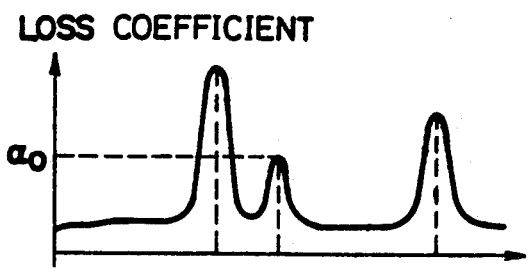
FIG. 3b
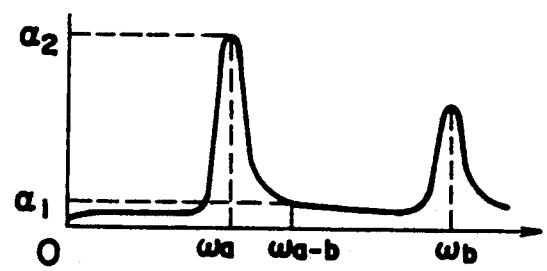
FIG. 3a
FIG. 4
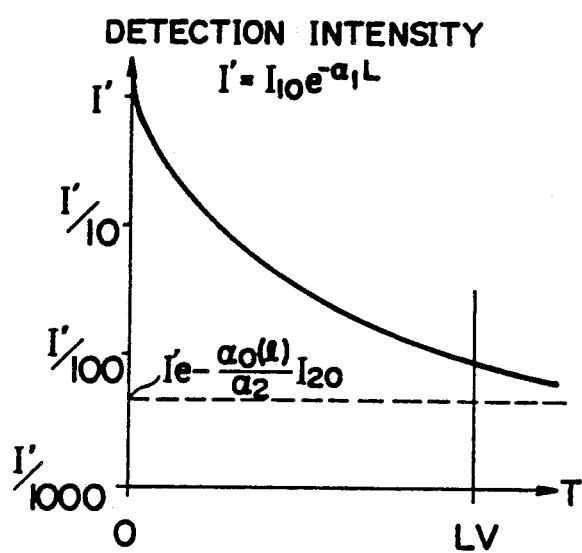

FIG. 7
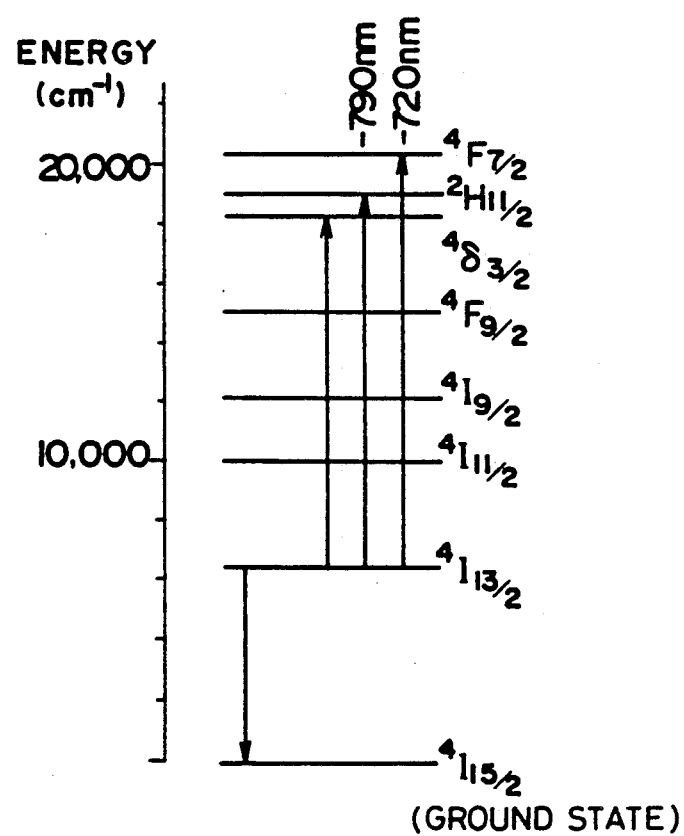
(GROUND STATE)
FIG.8b
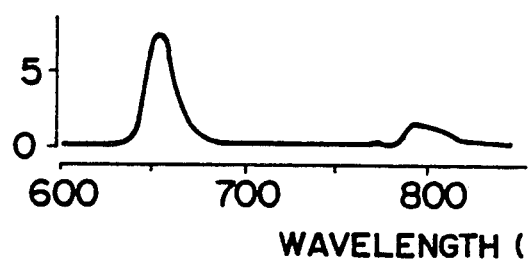
FIG.8a

SENSING SYSTEM USING OPTICAL FIBERS

BACKGROUND OF THE INVENTION

1. Field of the Invention

This invention relates to a sensing system using optical fibers to measure the distribution of some measurands, such as temperature, pressure and etc., distributed along an optical fiber's longitudinal direction.

2. Prior Art

A technique called Optical Time Domain Reflectometry (OTDR) has been popularly used for the distributed sensing of the measurands such as temperature, pressure and so on that are distributed along the optical fiber's longitudinal direction. This technique utilizes the property of an optical fiber that an introduced pulse light having a given wave length that enters an optical fiber from of end of eventually returns to that end with a part of the light experiencing a certain degree of back scattering at a given point along the longitudinal direction of the fiber. This allows one to determine the location of the point as a function of the time required for the measured light to come back and to calculate the loss of the light at the given point of the optical fiber by the difference between the intensity of the incident light and that of the reflected light. Conversely, if the loss of light introduced at a point in an optical fiber varies as a function of ambient temperature, pressure and other variable factors, the physical quantities such as temperature and pressure which are specific to the point can be determined by observing the variation of the loss of the light at the point.

The above described method is, however, accompanied by certain disadvantages. The ratio of back scattering light intensity relative to the light introduced into the optical fiber of an instrument using this technique is normally too small. So is the S/N ratio, due to the fact that the introduced light is a pulse light and therefore the quantity of the light that can be detected per unit time is limited. The dynamic range of instrumentation of such an instrument is very small. Consequently, more than several seconds or, in some instances, more than several minutes will be required for one instrumentation, as it involves tens of thousands of averaging operations when a high accuracy of measurement is essential. Since a commercially available wave length instrument has a dynamic range of 17 dB to 20 dB, for higher dynamic ranges, there have been proposed sensing systems using optical fibers that utilize a high-power semiconductor laser device that can generate a light of approximately 1 W or a Nd:YAG laser device having an output of several watts. However, such a system inevitably involves a large cost for the light source and the risk of generating in the optical fiber nonlinear optical effects that, in turn, cause noises in the system.

It is therefore an object of the present invention to provide a sensing system using optical fibers that utilize a relatively large quantity of light per unit time and offer an improved S/N ratio and a widened dynamic range of instrumentation.

SUMMARY OF THE INVENTION

According to the present invention, the above and other objects of the invention are achieved by providing a sensing system using optical fibers, comprising an optical fiber having loss characteristics such that the loss of a signal light wave with a wavelength different from that of a pumping light wave varies with said pumping light wave launching into said optical fiber, the amount of said loss variations being further varied as a function of an externally applied measurand, said signal light wave being launched from one end of said optical fiber (hereinafter referred to as fiber end (A)) and directed to the other end (hereinafter referred to as fiber end (B)) thereof, said pumping light wave being launched into said fiber end (B) and directed to the fiber end (A) variations of the intensity of said signal light wave being detected at the fiber end (B) to determine the measurand applied to said optical fiber along the optical fiber's longitudinal direction.

Now the present invention will be described in more detail by referring to the accompanying drawings.

BRIEF DESCRIPTION OF THE DRAWINGS

FIG. 3(a) is a graphic illustration showing the loss characteristics of a doping material on the ground state.

FIG. 3(b) is a graphic illustration showing the loss characteristics of a doping material on an excited energy level, under an excited condition, FIG. 4 is a graphic illustration showing the intensity response of a signal light wave coming out of the fiber (B), after optical pumping with a pumping light wave in an optical fiber sensing system according to the invention, FIG. 7 is conceptual illustration showing different energy level of $Er^{3+}$.

FIG. 8 is a graphic illustration showing the loss spectrum of Er under a nonexcited condition, and the loss spectrum of Er under an excited condition.

DETAILED DESCRIPTION OF THE INVENTION

Figure 1:
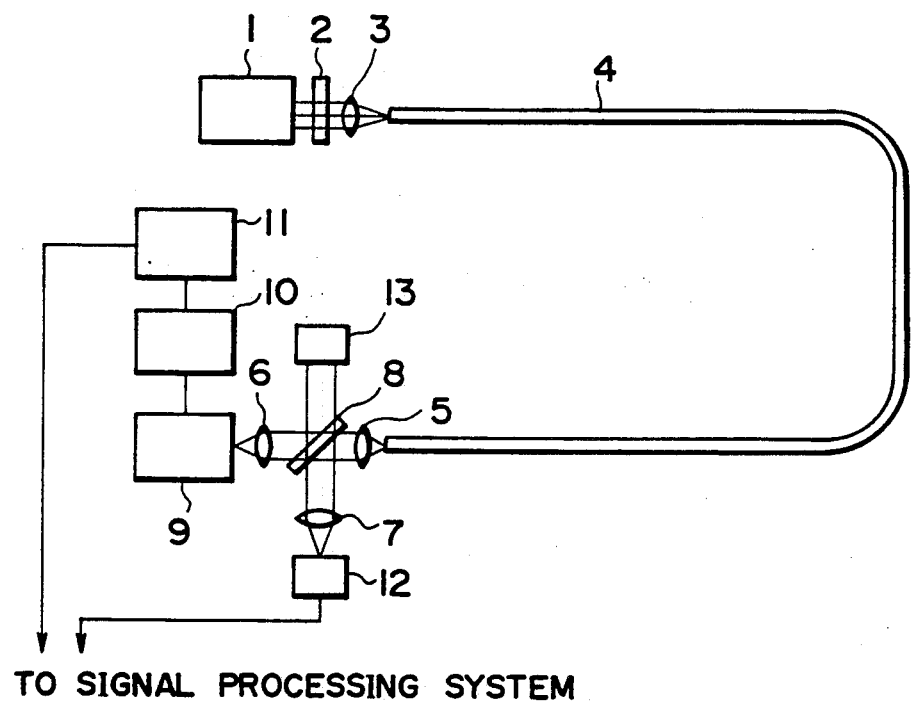
FIG. 1 is a schematic illustration of the configuration of a sensing system using optical fibers according to the invention.

FIG. 1 schematically shows the configuration of a sensing system using optical fibers according to the present invention. Reference numeral 4 denotes an optical fiber having loss characteristics which are subjected to variations at the wavelength of a signal light wave when said pumping light wave is introduced into said optical fiber, the amount of said variations further varying as a fuction of externally applied physical quantities (measurands), said optical fiber being doped with a material having two or more different energy levels. Reference numeral 9 denotes a pulse light source to emit a pumping light wave having frequency $\omega_a$ (or $\omega_b$) that corresponds to the amount of transition energy required for the dopant material to transit from the ground state $\Omega_0$ to a given excited level $\Omega_a$ or a higher energy level, such as $\Omega_b$. A pulse light driven by a pulse generator 11 and a drive circuit 10 are introduced into the optical fiber from the fiber end (B) passing through a lens 6, a beam splitter 8 and another lens 5. Reference numeral 13 denotes a light detector for monitoring the intensity stability of the outgoing pulse light of the pumping light wave and establishing a desired level of the outgoing pulse light and therefore it does not constitute an essential component of the system. Reference 1 denotes a light source for being introduced into the fiber (A) through a filter 2 and a lens 3, and the light source emits the signal light wave having frequency $\omega_{a-b}$ that corresponds to the amount of transition energy required for the dopant material to transit from said given excited energy level $\Omega_a$ to another excited energy level $\Omega_b$, which is higher than level $\Omega_a$, into one end of said optical fiber 4. Said signal light wave may be in the form of either continuous light or pulse light. Reference numeral 12 denotes a light detector for measuring the intensity of the signal light wave coming out of the fiber end (B) through the lens 5, the beam splitter 8 and the lens 7. The filter 2 passes the signal light wave, while it blocks or significantly attenuates the pumping light wave and the beam splitter 8 selectively reflects the signal light wave coming from the light source 1 while it passes almost all the pumping light wave coming from the light source 8.

Figure 2:
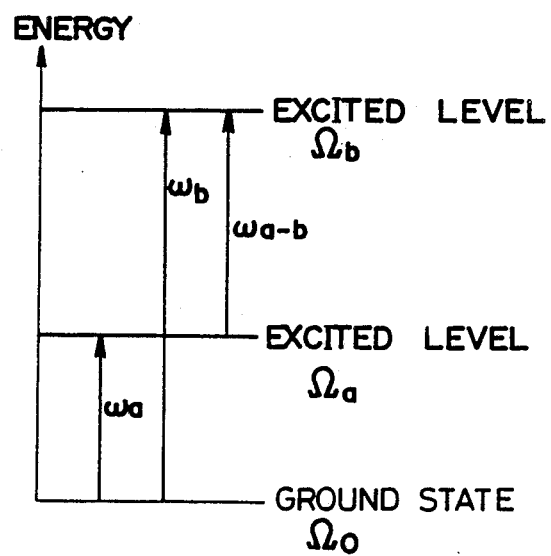
FIG. 2 is a conceptual illustration showing different energy levels of a doping material.

If the doping material applied to the optical fiber has three different energy levels of the ground state $\Omega_0$ and and two different excited level $\Omega_a$ and $\Omega_b$, as illustrated in FIG. 2, the loss characteristics of the material normally shows a large loss coefficient for frequency $\omega_a$ that corresponds to the amount of transition energy required for the material to transit from the ground state $\Omega_0$ to the excited level $\Omega_a$ and another large loss coefficient for frequency $\omega_b$ that corresponds to the amount of transition energy required to transit from the ground state $\Omega_0$ to the excited level $\Omega_b$, as illustrated in FIG. 3(a).

While such a material is normally found on the ground state $\Omega_0$, a given portion of the material doped into the optical fiber transits to excited level $\Omega_a$ when it is exposed to an intense light with frequency $\omega_a$, although it returns to the ground state $\Omega_0$ when a certain period of time has elapsed after termination of the exposure to irradiation of the intense light. The period of time required for the material to transit from the excited level $\Omega_a$ down to the ground state $\Omega_0$ is defined as the lifetime of the excited level $\Omega_a$.

The material shows loss characteristics as illustrated in FIG. 3(b), when the level $\Omega_a$ is excited and an incoming light with frequency $\Omega_{a-b}$ that reaches the material during the life time of the excited level $\Omega_a$. In other words, when excited the material has a large loss coefficient for frequency $\omega_{a-b}$ that corresponds to the amount of transition energy required for the material to transit from the excited level $\Omega_a$ to the higher excited level $\Omega_b$.

Now assuming that the signal light wave having frequency $\omega_{a-b}$ and intensity of light $I_{S0}$ is introduced into an fiber end (A) with length L and loss coefficient $\alpha_g$. The intensity $I_S$ of the signal light wave going out of the fiber end (B) is expressed by $I_S = I_{S0} \cdot \exp(-\alpha_g L)$. However, once a pulse light of the pumping light wave with frequency $\omega_a$ is introduced into the optical fiber from the fiber end (B), the intensity of the signal light wave going out of the fiber end (B) is varied as a function of time T, because said signal light wave is subjected to a further absorption by the excitation of the specific light wave. Care should be taken to establish the pulse cycle of said pumping light wave in such a way that the cycle intervals are sufficiently greater than the time required for a pulse to go and return from an end of the optical fiber to the other end and we must also consider the lifetime of excited level $\Omega_a$.

Now assuming that T represents the time counted from the moment when the first pulse of the pumping light wave is coupled into the optical fiber, l: the distance between the fiber end (B) and a point where the signal light meets the pumping light in the optical fiber; that is, l means the length where the signal light to be detected at the fiber end (B) is subjected to an increase of absorption caused by the pumping light wave, $\alpha_g(x) = \alpha_0(x) \cdot I_p(x)$: the loss coefficient of the excited region in the optical fiber by exposing of the pumping light wave at the signal light wavelength, where x represents a position along the optical fiber (where $I_p(x)$ represents the intensity of the pumping light wave at the position (x) in the optical fiber and depends on the location in the optical fiber and here assuming here that the loss coefficient of $\alpha_g$ is proportional to the intensity of the pumping light wave $I_p$, and the proportional coefficient is $\alpha_0$ and other parameters are defined as $V_{a-b}$: the speed of propagation of the signal light wave in the optical fiber, $\alpha_p$: the the loss coefficient at wavelength of the pumping light wave, $V_a$: the speed of propagation of the pumping light wave in the optical fiber, $\tau$: the lifetime of excited level $\Omega_a$. The lifetime is defined as the time required for the excited population to be reduced to $1/e$ of its initial value. If $V = 1/V_a + 1/V_{a-b}$ is defined, $T = l \times V$ is established.

If the level of dopant material in the optical fiber and the measurand along the optical fiber are homogeneous, $\alpha_0(l)$ is constant at any point in the optical fiber, then the intensity $I_s(T)$ of the signal light wave at time T, elapsed from the moment when the first pulse of said pumping light wave is coupled into the optical fiber is expressed by the following equation:

$$I_S(T) = I_{S0} \cdot \exp(-\alpha_g L) \cdot \exp[\{(\alpha_0 \cdot I_{p0} \cdot \tau)/(V - \alpha_p \tau) \times (-1 - T/\tau \cdot 1 - \alpha_p l)] - \exp(-\alpha L)\}] \quad (1),$$

where $I_{S0}$, $\alpha_g$ and L are so defined mentioned earlier and $I_{p0}$ represents the intensity of the pumping light wave at the fiber end (B). If it can be sufficiently assumed that the relationship $\tau >> T = l\, V_x$ exists, equation (1) may be expressed as follows:

$$I_S(T) = I_{S0} \cdot \exp(-\alpha_g L) \cdot \exp\{[\alpha_0(l) \cdot I_{p0}]/[\alpha_p] \cdot \times [e^{-\alpha_p l} - 1]\} \quad (2)$$

Figure 5:
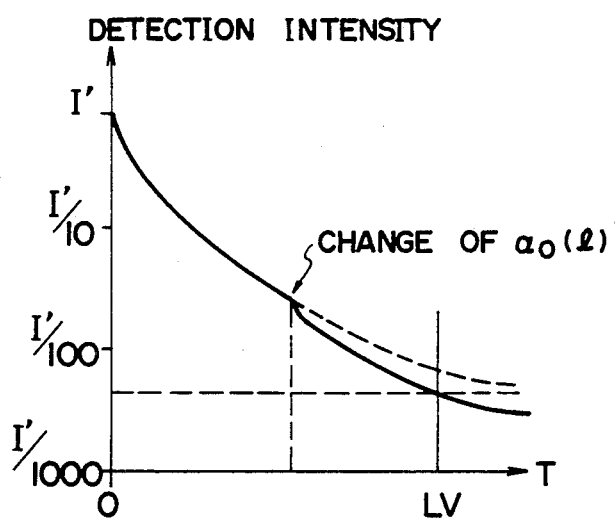
FIG. 5 is a graphic illustration showing the intensity of a signal light wave coming out of the fiber (B), after optical pumping with the pumping light wave as the the ambient temperature at a location of the optical fiber separated by distance l from the fiber end (B) is varied.

FIG. 4 is a graphic illustration of equation (2). This graph shows the characteristics of the case that $\alpha_0(l)$ is constant to length l. However, if $\alpha_0(l)$ is varied in response to variations of measurands (physical quantities) along the optical fiber and the measurands have distribution along the optical fiber, $\alpha_0(l)$ is not constant. If the measurands along the optical fiber are not homogeneous but different at the position of l, which corresponds to the time T, $\alpha_0(l)$ is also different from that at other places in the optical fiber, and so we observe the response of the output signal light wave as shown in FIG. 5, in which a small signal output change is indicated.

Therefore, we can obtain the change of measurand at that point by measuring the amount of variation of the change of the signal response change and the location can be identified by the time T. When the value of $\alpha_0(l)$ is not constant, but is varied by the physical quantities (measurand), the signal response can not be determined directly by using an analytical method, although the value of $\alpha_0(l)$ may be calculated by using an equation (3). And when we can determine the change of the measurand from the change of $\alpha_0(l)$ by using the measurement results of $I_{S0}$ and $I_S$.

$$\alpha_0(l) = (1/I_{p0}) \cdot e^{-\alpha \cdot T/V} [-(V/\tau)\{\log(I_S/I_{S0})\} + \alpha_g \cdot L\} - V(d/dt)(\log I_S/I_{S0})] \tag{3}$$

where $(d/dt)$ represents differentiation by time.

Figure 6:
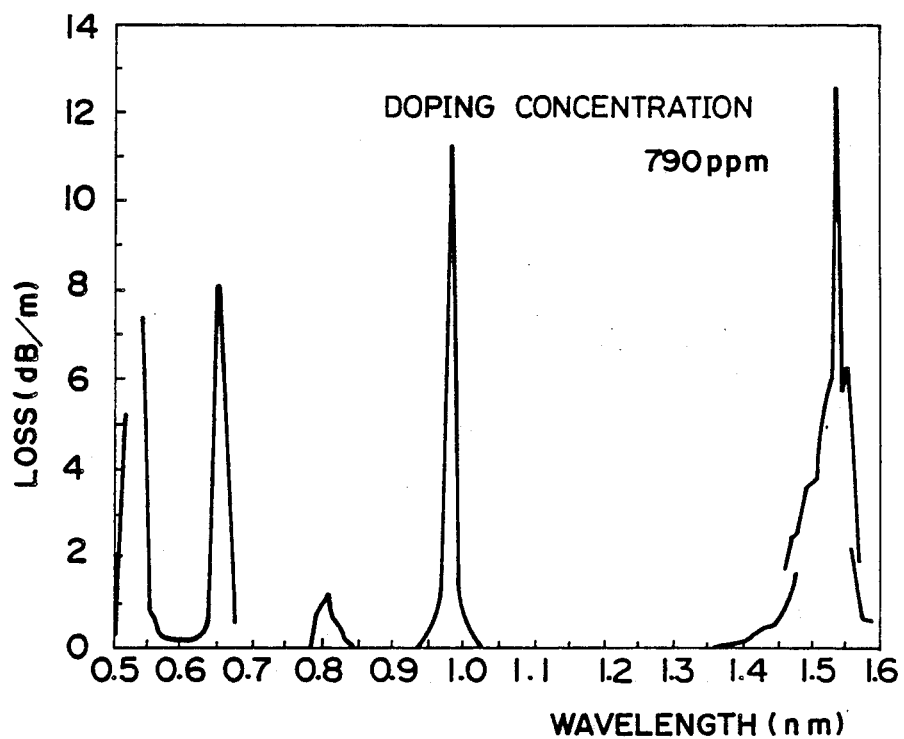
FIG. 6 is a graphic illustration showing the loss spectrum of an Er-doped optical fiber.

Now the present invention will be described further by way of an embodiment of the invention. An optical fiber that can be suitably used for the purpose of the present invention can be prepared by a rare-earth element doped into the core of a silicate glass optical fiber. FIG. 6 illustrates the loss characteristics of an optical fiber prepared by $Er^{3+}$ doped with a concentration of 780 (wt)ppm into the silicate glass optical fiber.

$Er^{3+}$ has an energy configuration as illustrated in FIG. 7, and a remarkable absorption of energy found at and around 1.5 $\mu$m in FIG. 8 corresponds to transition energy from the ground state $^4I_{15/2}$ to the exited energy level $^4I_{13/2}$. Two other remarkable absorptions are also shown in FIG. 8 at and around 0.8 $\mu$m and 0.85 $\mu$m, they are respectively caused by transitions from the ground state $^4I_{15/2}$ to the excited energy level $^4I_{9/2}$ and from the ground state $^4I_{15/2}$ to the excited energy level $^4F_{9/2}$. When an intense light (semiconductor laser beam) having a wavelength of 1.5 $\mu$m or so is introduced into the fiber as excitation, the spectrum between 0.8 $\mu$m and 0.8 $\mu$m comes to show, as illustrated in FIG. 8(b), an increased level of absorption at or around 0.7 $\mu$m and also at 0.8 $\mu$m which are not found in the previous loss spectrum (under a nonexcited condition) when the semiconductor laser beam with a wavelength of 1.5 $\mu$m or so is not introduced into the optical fiber as illustrated in FIG. 8(a). These increased absorptions are respectively based on the transitions from the excited level $^4I_{13/2}$ to the level $^4F_{7/2}$ and from the level $^4I_{13/2}$ to the level $^4H_{11/2}$ and correspond to $\omega_{a-b}$ of FIGS. 2 and 3. When a signal light (or the signal light wave) with a wavelength of 0.72 $\mu$m which is obtained by spectroscopically processing a light from a white light source by means of a monochronometer is introduced into said optical fiber 4 from the fiber end (A) thereof, the intensity of the light coming out from it shows a variation as illustrated in FIG. 4 as it is measured by a light detector 12 arranged at the other end thereof. Alternatively, a light emitted from an LED or a semiconductor laser beam having the same wavelength may also be used for the signal light. The life of the excited energy level $^4I_{13/2}$ proved to be as long as 14 m when measured in an experiment and this fact indicates that equation (2) is good for use when the light of an optical fiber is less than several hundred kilometers.

Since the concentration of $Er^{3+}$ in this measurement is high, the loss coefficient (that corresponds to $\alpha_p$ in equation (2)) of the pulse light (the pumping light wave) generated by a semiconductor laser device should be very large at or around 1.5 $\mu$m and therefore the optical fiber will become ineffective as the intensity of the pulse light coming from a semiconductor laser device for exciting the fiber should become weak at or around 1.5 $\mu$m, if the optical fiber is too long. In view of this fact, an optical fiber which is 30 m long is used for this embodiment, although a longer optical fiber may be used, if the $Er^{3+}$ concentration is too small. For practical purposes, an optical fiber as long as 5 km may be feasible, the $Er^{3+}$ concentration being as low as several ppm or less. Apart from this, it is known that the rate of absorption of ions of a rare-earth element due to transition between the excited energy levels is varied by variation of ambient temperature. (See "The Temperature Dependency of Electron Transition in Rare Earth Ions": M. C. Farries et al, Electron Lett. Vol. 22, No. 8, p. 418, 1888) When the temperature at a point separated by distance l from the fiber end (E) was subjected to changes in an experiment, it produced a result similar to the loss characteristics as illustrated in FIG. 5. Therefore, the temperature at this point can be known by the change that took place on the line having the loss characteristics of FIG. 5. A high speed detector utilizing Si was used for the light detector 12 in the experiment. A dye laser device that emits light with a wavelength of 0.73 $\mu$m and an intensity of light which is greater than that of a white light source is used for the light source 1 to produce a dynamic range of approximately 30 dB or more. The loss coefficient $\alpha_0(l) \cdot I_p$ of a signal light having a wavelength of 0.7 $\mu$m, due to introduction of the pumping light wave, can be increased by augumenting the intensity of the pulse light of the wavelength of 1.5 $\mu$m coming from the optical fiber, although the maximum feasible length of the optical fiber inevitably diminishes as a result of such manipulation. Therefore, when a long optical fiber is used, the intensity of the pumping light wave to be introduced into the optical fiber should be reduced. Lanthanoids such as Ho, Tm and Sm and actinoids, such as U, as well as alkali metal ions and alkaline earth metal ions that have similar effects as an alternation change by the optical pumping which is observed in rare-earth elements may be used for doping an optical fiber in place of Er. (Only the clad area of the optical fiber may be doped for the purpose of the present invention.)

Organic compounds such as dyes can be used for doping when the optical fiber 4 has a core made of a liquid material. Photochromic glass and other materials having a phototropy effect may also be used for doping.

Absorption due to defects of the glass structure of an optical fiber may also be utilized for the purpose of the present invention. It should be noted that the approximation of $\tau \gg T$ in the analytical process described earlier is not essential and a sensing system using equation (1) may be also feasible. While the loss coefficient which is determined on the basis of the incoming signal light wave is a linear function of the intensity of the pumping light wave $\alpha_0(l) \cdot I_p$ in the above analytical process, it may not necessarily be so and, if such is the case, sensing operations can be conducted by comparing the situation where the environment physical quantities to be determined are constant and the situation where they are partially varied, although the relationship as illustrated in FIGS. 4 and 5 are not applicable in such a case.

As is apparent from the above description, a sensing system using optical fibers according to the present invention, unlike the conventional OTDRs that utilize back scattering of a signal light wave in an optical fiber, utilizes the light wave passing through an optical fiber as signal in order to enhance the efficiency and effectiveness of the system and therefore it has a significantly improved S/N ratio and a dynamic range of measurement as compared with those of the conventional OTDRs. Moreover, continuous light may be used for the signal light wave to increase the rate of light emission for detection and to reduce the time required for measurement, providing remarkable advantages of the system when used for industrial applications.

What is claimed is:

1. A sensing system using optical fibers, comprising:
an optical fiber having loss characteristics such that the loss in a signal light wave, with a wavelength different from that of a pumping light wave, varies with the extent of transmission of said pumping light wave into said optical fiber, the amount of said loss variations being further varied as a function of an externally applied measurand; and
means for transmitting said signal light wave from one end of said optical fiber, directed to the other end thereof, said pumping light wave being transmitted from said other end of said optical fiber and directed to the one end thereof, variations of the intensity of said signal light wave being detected at said other end to determine the measurand applied to said optical fiber along the optical fiber's longitudinal direction.

2. An sensing system using optical fibers according to claim 1, wherein said signal light wave is a continuous light.

3. An sensing system using optical fibers according to claim 1, wherein said pulse light of the pumping light wave is emitted for a period of time longer than the time required for the light to go from an end and come back from the other end of the optical fiber.

4. An sensing system using optical fibers according to claim 1, wherein a pause in emission of said pulse light of the pumping light wave is longer than the time required for the light to go from an end and come back from the other end of the optical fiber, the pause being the time period during which no pulse light is transmitted.

5. An sensing system using optical fibers according to claim 1, wherein said pumping light is a pulse light having a pulse width greater than the time required for the pumping light to go from an end to the other end of the optical fiber and subsequently for the signal light to go from the end to the other end of the optical fiber.

6. An sensing system using optical fibers according to claim 1, wherein said optical fiber is made of silicate glass doped with rare-earth elements, alkali metal ions, alkaline earth metal and/or transition metal ions.

7. An sensing system using optical fibers according to claim 1, wherein said optical fiber is made of silicate glass doped with $Er^{3+}$.

* * * * *